SIGNAL SEPARATOR FOR A SELF-CLOCKING DIGITAL MAGNETIC RECORDING

Filed May 19, 1966 2 Sheets-Sheet 1

INVENTOR.
ELEUTHERE POUMAKIS
BY
Lane, Aitken, Dunner & Ziems
attorneys

Sept. 16, 1969 E. POUMAKIS 3,467,955

SIGNAL SEPARATOR FOR A SELF-CLOCKING DIGITAL MAGNETIC RECORDING

Filed May 19, 1966 2 Sheets-Sheet 2

INVENTOR.
ELEUTHERE POUMAKIS
BY
Lane, Aitken, Dunner & Ziems
attorneys

United States Patent Office 3,467,955
Patented Sept. 16, 1969

3,467,955

SIGNAL SEPARATOR FOR A SELF-CLOCKING DIGITAL MAGNETIC RECORDING

Eleuthere Poumakis, East Islip, N.Y., assignor to Potter Instrument Company, Inc., Plainview, N.Y., a corporation of New York Filed May 19, 1966, Ser. No. 551,357
Int. Cl. G06k 7/08
U.S. Cl. 340—174.1 8 Claims

ABSTRACT OF THE DISCLOSURE

This specification discloses a system for reading out self-clocking data stored along a magnetic track. The system generates pulses in response to each flux transition read out from the magnetic track. It is necessary to determine for each pulse whether it occurs atfer a short interval following the preceding pulse or after a long interval. This is accomplished by detecting whether each interval between adjacent pulses is longer or shorter than a standard deflection interval. The length of the standard detection interval is controlled to be longer following a long interval vetween pulses and to be shorter following a short interval between pulses.

This invention relates to high density storage of digital data on a magnetic recording tape and more particularly to a dual timing signal separator to distinguish long and short intervals between adjacent flux transitions in a high density self-clocking magnetic recording system.

In magnetic tape high density storage of self-clocking binary information, the information and clock pulses are formed by flux transitions between states of magnetism spaced along the track on the tape. The flux transitions representing the clock pulses are positioned at regular intervals along the track and the information pulses are represented by the presence or absence of a flux transition between each of the regularly occurring flux transitions. The information is recorded in such a manner that two absenses of flux transitions never occur at adjacent positions along the track. Each flux transition is read out and converted into a pulse and the resulting pulse train is decoded to recover the binary information represented by the flux pattern. Ideally successive pulses in the pulse train produced from the pattern of flux transitions should be separated by predetermined intervals. The intervals between the clock pulses are determined as being long intervals. The binary information is placed between the clock pulse flux transitions and the distance between these transitions is determined as a short interval. The process of decoding the pulse train involves distinguishing between these long and short intervals.

To recover the binary information recorded in the track, the track is moved past a transducing head at a constant speed. The resulting waveform produced by the transducers is differentiated to make the flux transitions more easily recognizable. This differentiation produces a waveform oscillating about the zero point with each zero crossing being represented by a flux transition. These zero crossings are then converted to pulses making up the pulse train to be decoded. Because of the high density with which the flux transitions are recorded, pulse crowding occurs. The phenomena results in the interval between pulses lengthening or shortening, with respect to its normal interval, because of the influence of the other flux transitions on the tape, particularly the neighboring or adjacent flux transitions. It has been found that the interval between pulses will shorten, following a previous short interval between pulses and the interval between pulses will lengthen, following a previous long interval between pulses.

Normally a circuit which is utilized to retrieve information stored on a magnetic recording tape provides a preset detection period, so that any input pulse received within that period, is determined as following a short interval. If no input is received during the detection period, the interval between pulses is determined as being long. However, such a system does not take into account the tendency of the intervals between pulses to lengthen or shorten as described above. This becomes critical as the density of the recordings increase and errors result.

The system of the present invention permits a more accurate determination of whether a flux transition and its resulting signal pulse occurs after a short or long interval between flux transitions without reducing the density of the flux transitions, by providing a longer detection time for a pulse following a long interval and a shorter detection time for a pulse following a short interval.

Among the objects of the present invention, therefore, are: the provision of a novel magnetic storage system in which self-clocking information can be stored with increased density; and the provision of a signal separator for use in a self-clocking magnetic storage system to determine whether input pulses occur after a long or short interval following the preceding pulses.

Other objects and further scope of applicability of the present invention will become apparent from the detailed description to follow, taken in conjunction with the accompanying drawings in which.

Figure 1:
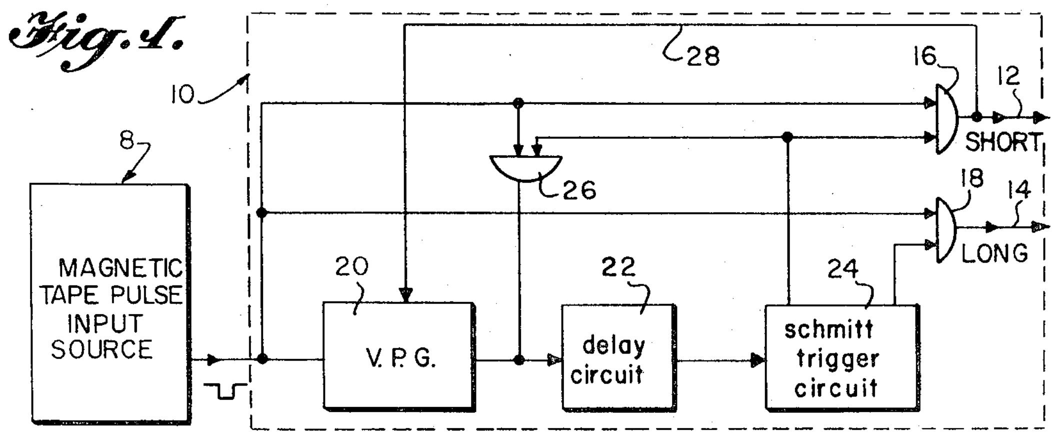
FIG. 1 is a block diagram of the present system.

As indicated above, in a magnetic tape high density storage system clock pulses are formed by flux transitions spaced at regular intervals along a magnetic recording tape. Bits of binary information are represented by the presence or absence of a flux transition between the regular occurring clocking flux transitions. For example, the presence of an information flux transition between the regularly spaced clocking flux transitions may represent binary 1 and the absence of such a flux transition may represent binary 0. When the binary information is recovered, the tape is moved past a transducing head at a constant speed. This produces a waveform which in turn is converted to pulses which make up the pulse train to be decoded. The transducing head and converter are shown in block form as the magnetic tape pulse input source 8 in the block diagram of FIG. 1. After the pulses have been formed they are fed to the signal separator 10 of the present invention. These pulses, fed to the signal separator, are received either after what has been determined as a long interval between pulses or after what has been determined as a short interval between pulses. This is accomplished by providing the signal separator 10 with a standard detection interval. If a pulse is received during this detection interval, it is recognized as having occurred after a short interval has elapsed since the preceding pulse. Where a pulse is received after the termination of the detection interval, it is recognized as having occurred after a long interval has elapsed since the preceding pulse. Hereinafter pulses occurring during the detection interval will be described as short interval pulses and pulses that occur after the detection interval will be described as long interval pulses.

The signal separator is provided with two outputs 12 and 14 which provide output pulse trains representative of the stored information. One output 12 provides a pulse train representative of short interval input pulses while the second output 14 provides a pulse train representative of long interval input pulses. Each output 12 and 14 is provided with enabling AND gates 16 and 18 respectively. The AND gate 16, when enabled, allows the passage of a short interval input pulse through its input coupled with the input of the signal separator 10. The output AND gates 16 and 18 are enabled by an enabling signal voltage from a Schmitt trigger circuit 24.

The STC 24 has two stable states. One untriggered state provides an enabling signal to the long interval AND gate 18 and the other triggered state provides an enabling signal to the short interval AND gate 16. The STC 24 is triggered by a signal voltage pulse supplied by a variable pulse generator 20 which is actuated by the input pulses from a recording track. A feedback line 28 is provided from the short interval output 12 to the variable pulse generator 20 to adjust the output of the variable pulse generator 20 after a short interval input is encountered. A time delay circuit 22 is coupled between the variable pulse generator 20 and the STC 24. AND gate 26 prevents the STC 24 from changing state during a short interval pulse.

The operation of the signal separator 10 as shown in the block diagram of FIG. 1 may be described as follows. The signal separator 10 operates in such a way so as to provide a detection period after each pulse input. If another input pulse passes through the signal separator during this detection period, it is recognized as having occurred within a short interval of time after the preceding pulse and it is fed through pulse train output 12 representing input pulses that occur after short intervals. If the next input pulse does not occur within this detection period, it is recognized as having occurred after a long interval of time after the preceding pulse and it is fed through the long pulse train output 14.

Input pulses from magnetic tape track and processed through the reading transducer and converter 8 are coupled to the signal separator 10. Each pulse input, whether it occurs after a long or short interval, is coupled to one input of each AND gates 16 and 18. When a pulse passes through the AND gate 16 a short interval pulse is recognized at the short interval output 12 and when a pulse passes through the AND gate 18 a long interval pulse is recognized at the long interval output 14.

To enable an input pulse to pass through either output gates 18 or 16, depending upon the time interval since the last input pulse, the respective gate must be enabled. This is accomplished by an enabling voltage signal which is supplied from the STC 24. During the detection interval, which follows each applied input pulse, the STC 24 will be in its triggered state and will feed an enabling signal to the short interval AND gate 16. Thus, if a pulse is preceded by a short interval, it will occur during the detection interval and will pass through the enabled AND gate 16 to the short interval pulse output 12. If a pulse does not occur during the detection interval, the STC 24 will be switched back to its untriggered state and will apply an enabling signal to the AND gate 18. Thus, the pulse will be immediately passed through the long interval AND gate 18 to the long interval pulse train output 14.

Each input pulse in addition to being applied to the gates 16 and 18 is also applied to the variable pulse generator 20. In response to each applied pulse, the pulse generator 20 will produce an output pulse having a length *d*. The variable pulse generator will initiate its output pulse at the trailing edge of the applied input pulse. The output pulse of the variable pulse generator 20 is coupled to the STC 24 through the timing circuit 22. The output pulse of the variable pulse generator 20 triggers the STC 24 switching it from the untriggered to the triggered state. This switching removes the enabling voltage signal from the long interval gate 18 and applies an enabling voltage signal to the short interval gate 16. The STC 24 remains in the triggered state for the duration of the pulse from the variable pulse generator 20 plus the length of a delay provided by the timing circuit 22. The duration of detection interval following each input pulse is thus determined by the length of the pulse produced by the variable pulse generator 20 plus the length of the delay provided by the timing circuit 22. The pulse from the variable pulse generator 20 following a long interval between inputs preferably has a time duration of 0.45 millisecond and the delay added by the timing circuit 22 is preferably 0.1 millisecond. thus, the detection period following a pulse preceded by a long interval is 1.45 milliseconds during which time the short interval gate 16 is enabled.

If at the end of the detection period no input pulse is received, the STC 24 is switched back to its untriggered state by the application of a voltage signal and the operation described above is repeated.

If an input pulse is preceded by a short interval, it will be received during the detection interval when the STC 24 is in its triggered state and the short interval gate 16 is enabled. Thus, the input pulse is passed through the short interval gate 16 to the short interval pulse train output 12. The input pulse is also fed back through line 28 to the variable pulse generator 20. This feedback pulse reduces the width of the output pulse of the variable pulse generator 20 produced in response to the input pulse as hereinbelow described to a duration of approximately $d/2$ or 0.2 millisecond. Since the detection interval during which the STC 24 is triggered is determined by the length of the output pulse of the variable pulse generator 20 plus the length of the delay provided by the timing circuit 22, the reduction of the length of the output pulse of the variable pulse generator 20 reduces the length of the detection interval. Thus, the detection interval after a pulse preceded by a short interval is reduced to 0.2 millisecond plus 1.0 millisecond or to 1.2 milliseconds.

It can be seen therefore that the circuit operates to allow a longer detection period after a pulse preceded by a long interval and it operates to allow a shorter detection period after a pulse preceded by a short interval.

Since a trigger output pulse from the variable pulse generator 20 is not developed to switch the STC 24 to its triggered state until the trailing edge of the input pulse, it is possible for an input pulse to be received and immediately thereafter to have the STC 24 switched back to the untriggered state during the time interval needed for the trailing edge of the input pulse to reach the variable pulse generator 20. This would result in an incomplete pulse at the output 12. To prevent the switching of the STC 24 to the untriggered state, AND gate 26 is provided, which is enabled by a voltage pulse from the short interval output of the STC 24. The second input of AND gate 26 is coupled directly to the input of the signal separator 10 and when an input pulse is received while the STC is in the triggered state the input pulse is passed through AND gate 26 directly to the input of STC 24. This voltage pulse is sufficient to maintain the STC 24 in the triggered condition.

Figure 2:
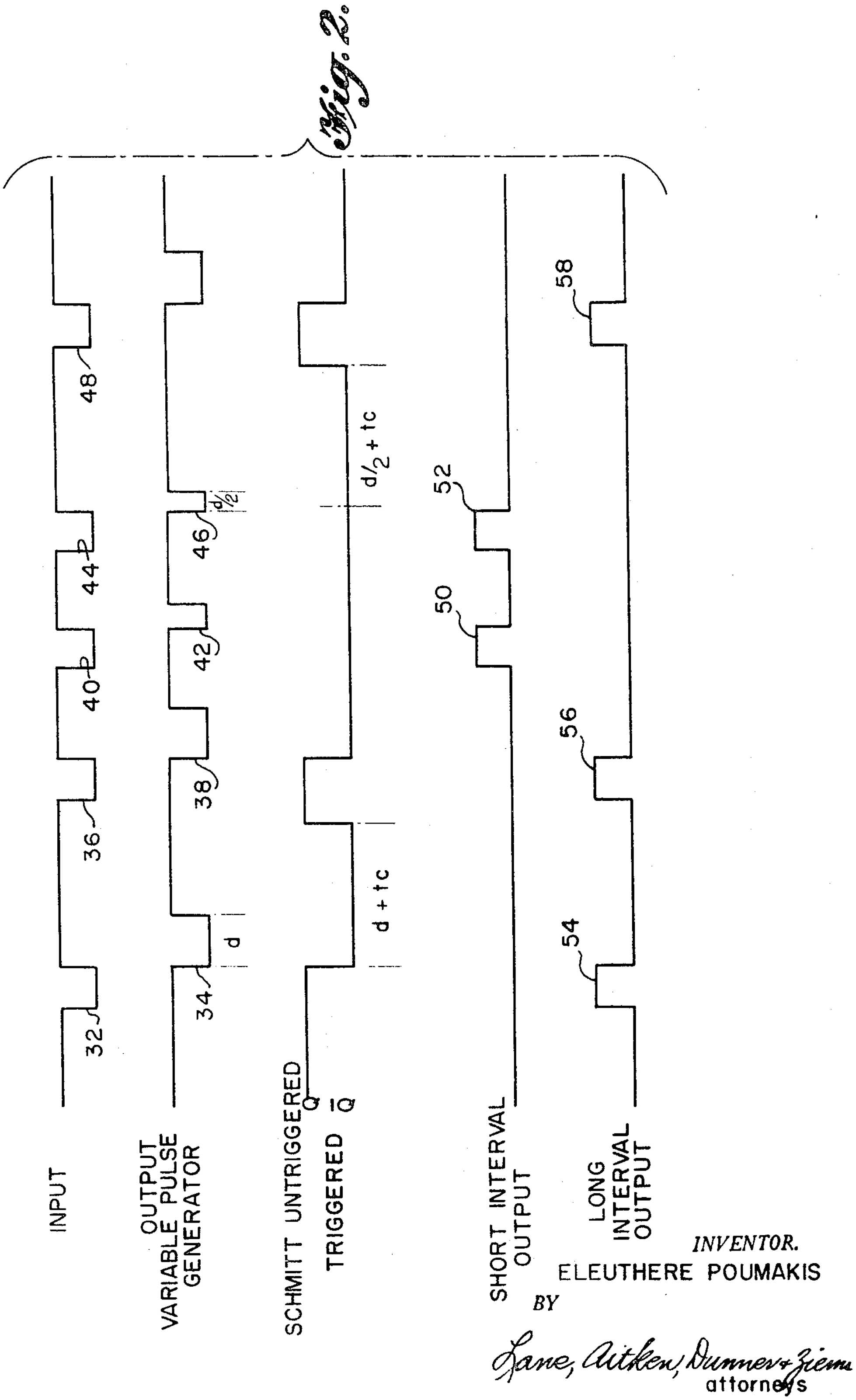
FIG. 2 illustrates graphically a timing chart of the signal pulses.

The timing diagram of FIG. 2 represents the signal waveforms that occur during the operation of the device. An input pulse 32 is coupled to the variable pulse generator 20. For convenience this input pulse 32 will be assumed to follow a long interval between pulses. In response to the pulse 32 variable pulse generator 20 produces an output pulse 34 of a width *d*, which starts at the trailing edge of the pulse 32. This pulse 34 from the pulse generator 10 switches the STC 24 from its untriggered state Q to its triggered state $\overline{Q}$. Following the trailing edge of the pulse 34, the STC 24 remains in the triggered state for a period of time equal to the time delay provided by the timing circuit 22 before it is switched back to the untriggered state. In this manner the STC 24 is maintained in its triggered state for about ¾ of the length of time of the long interval between pulses. A second input pulse 36 following a long interval again triggers the variable pulse generator 20 which produces pulse 38 and switches STC 24 to the triggered state. When a short interval input pulse 40 is then received, the variable pulse generator 20 produces an output pulse 42, as explained herein, equal to about half the width of the pulse 34. This pulse will again charge the timing circuit 22 to restart its time delay and the STC 24 will remain in the triggered state. In a normal self-clocking recording system, at least two short interval pulses will occur together such as shown at 40 and 44. This second input pulse 44 also results in an output pulse 46 from the variable pulse generator 20 which keeps the STC 24 in the triggered state. If no short interval input pulse is encountered, the STC 24 will remain in the triggered state for a duration equal to the length of time of the pulse 46 plus the time delay $tc$ provided by the timing circuit 22 before being switched to the untriggered state. Thus, it can be seen that following a long interval between input pulses, the STC 24 remains in the triggered state for a longer interval that is $d+tc$, than following a short interval which is represented by $d/2+tc$. An input pulse 48 is shown after the STC 24 switches back to its untriggered state and therefore the pulse 48 is a long interval pulse.

The short interval pulse train output waveform, representing the waveform at the short interval output 12 is shown having two pulses 50 and 52. Only pulses occurring after short intervals are included in this pulse train output. The long interval pulse train output waveform, representing the waveform at the long interval output 14, is shown having three pulses 54, 56 and 58 each occurring after a long interval between pulses.

Figure 3:
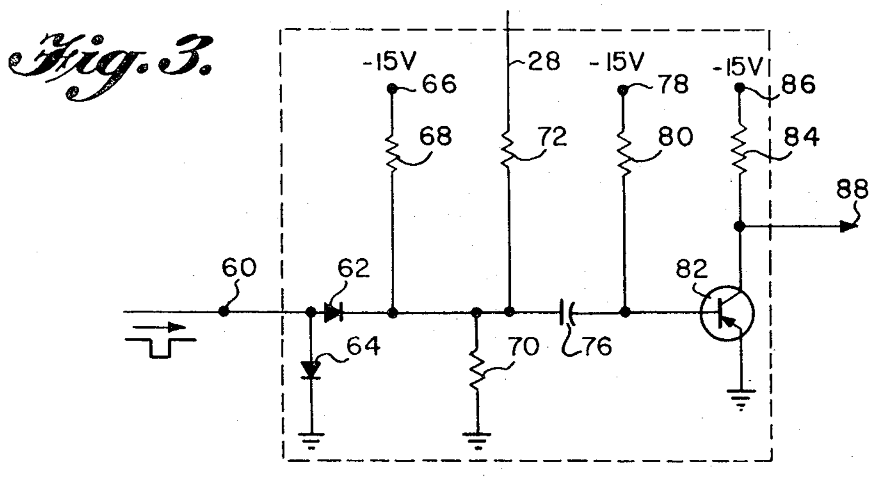
FIG. 3 is a schematic diagram of the variable pulse generator of the invention.

FIG. 3 is a schematic diagram of the variable pulse generator 20.

The input terminal 60 is coupled to a diode 62. Diode 64 is connected between the input terminal 60 and ground. The diode 62 is coupled to a —15 volt source applied at terminal 66 through resistor 68 and to ground through resistor 70. Line 28 is connected through resistor 72 to one side of a capacitor 76. The other side of the capacitor 76 is connected to the base of transistor 82 and to a —15 volt source at terminal 78 through resistor 80. The emitter of the transistor 82 is grounded and the collector is connected to a —15 volt source at terminal 86 through resistor 84 and to the output point 88.

As indicated above, if the input pulse follows a long interval between pulses, the short allow AND gate 16 is not enabled and no feedback pulse will be received over line 28. A —5 volt input pulse will drive the input side of the capacitor 76 to —5 volts. The input pulse normally would tend to drive the base of the transistor 82 more negative, but since the transistor 82 is conducting, its base remains at ground potential.

When the input pulse terminates the voltage across capacitor 76 cannot change immediately and accordingly, the voltage at the base of the transistor 82 will rise toward a positive value. The transistor 82 will be cut off until the capacitor 76 discharges through the resistor 80 to a point near ground potential to turn the transistor 82 back on. The output pulse of the variable pulse generator 20 will be generated while the transistor 82 is cut off and it is this length of time that it takes the capacitor 76 to discharge that determines the length of the output pulse of the pulse generator 20.

If the input pulse follows a short interval between pulses, then simultaneously with the applied input pulse a feedback pulse from the short allow AND gate 16 is applied to the capacitor 76 through line 28 driving the input side of the capacitor to a less negative value, for example, to a value of about —2 volts as compared with the —5 volt value following a long interval input pulse. This occurs because the feedback pulse applied on line 28 will cause the diode 62 to be back biased. Because the input side of the capacitor 76 is driven to a lower negative voltage value, the transistor side of the capacitor 76 will be driven to a less positive value at the termination of the input pulse so less time will be needed for the discharge of the capacitor 76 and the output pulse of the pulse generator 20 will be shorter.

Figure 4:
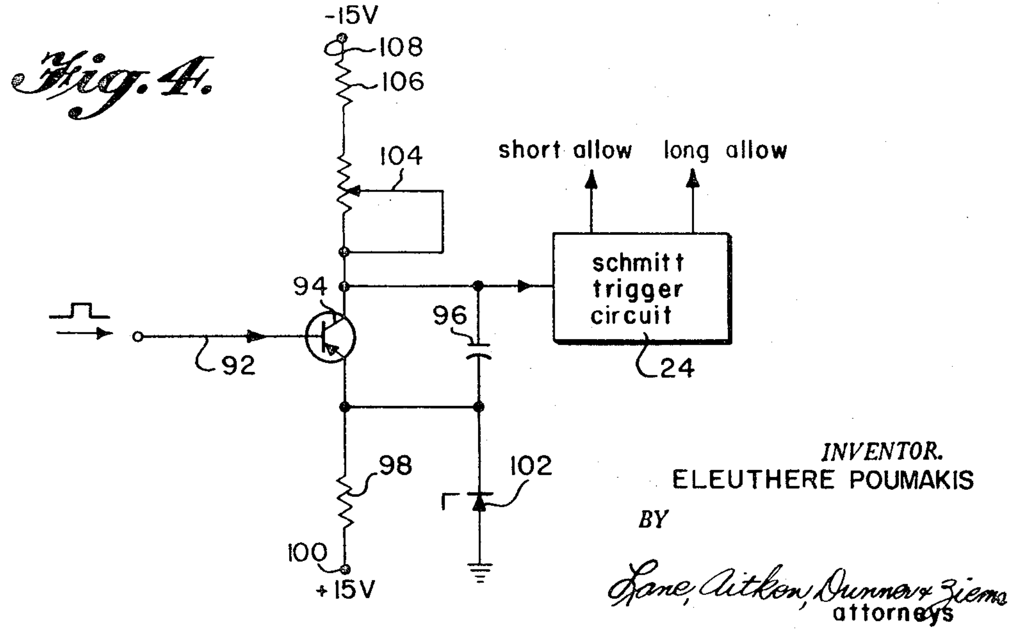
FIG. 4 is a schematic diagram of the integrator timing circuit of the invention.

FIG. 4 is a schematic diagram of the timing circuit 22 in combination with the STC 24. The output from the variable pulse generator 20 is fed into the timing circuit 22 at input line 92. Each pulse from the variable pulse generator 20 turns on transistor 94 which discharges the capacitor 96. One side of the capacitor 96 is connected through a resistor 98 to a source of +15 volts applied at a terminal 100 and through a diode 102 to ground. The diode 102 is operated in the breakdown region with current flowing from the 15 volt source through the resistor 98 and the diode 102 to ground so that a constant voltage is applied to one side of the capacitor 96. When the transistor 94 discharges the capacitor 96 in response to a pulse applied from the variable pulse generator 20, the voltage at the collector of the transistor 94 applied to the STC 24 will rise to the positive voltage value which is across the diode 102. As a result the STC 24 will be triggered. When the pulse from the variable pulse generator 20 terminates, current flows from the capacitor 96 through a pair of resistors 104 and 106 connected in series to a source of —15 volts applied at a terminal 108. This charges the capacitor 96 and causes the voltage applied to the STC 24 to change in the negative direction. After 1 millisecond the capacitor 96 will have charged sufficiently for the voltage at the input of the STC 24 to switch back to its untriggered state. The length of time it takes for the capacitor to charge plus the duration of the pulse applied from the variable pulse generator represents the detection period that the short allow gate 12 is enabled following each input signal pulse to the system.

It will be appreciated that the above description is illustrative only and not limiting. The invention has been described with reference to a self-clocking binary information magnetic tape recording system. However, the invention may be used with any type of high density retrieval system where the interval between information pulses tends to vary due to the effect of neighboring information pulses.

Obviously, numerous modifications of the present invention are possible without departing from the spirit and scope of the invention, which is defined in the appended claims.

What is claimed is:

1. A method of retrieving binary information recorded in a magnetic track in the form of flux transitions including the steps of: detecting whether the interval of time between pulses representing flux transitions stored on a magnetic storage tape is longer or shorter than a standard detection interval; and adjusting the length of the standard detection interval in accordance with whether the preceding interval between pulses was longer or shorter than the standard detection interval.

2. The method of claim 1 wherein the adjustment of the standard detection interval includes the steps of lengthening the time of the standard detection interval after it has been determined that the preceding interval was longer than the standard detection interval and shortening the time of the standard detection interval after is has been determined that the preceding interval was shorter than the standard detection interval.

3. A system for retrieving binary information recorded in a magnetic track in the form of flux transitions comprising: means for producing signal pulses from the flux transitions on the recording track, means to detect and separate signal pulses in accordance with whether they occur more and less than a standard detection interval after the preceding signal pulse and means to adjust the standard detection interval to be longer following a long interval between input pulses and to be shorter following a short interval between input pulses.

4. The system of claim 3 wherein the detection and separation means includes two output channels, one connected to receive the signal pulses occurring less than the standard detection interval after the preceding pulse and the other connected to receive the signal pulse occurring more than the standard detection interval after the preceding pulse.

5. A system as recited in claim 3 wherein said means to detect and separate signal pulses comprises a first gate and a second gate connected to receive said signal pulses, a trigger circuit operable to enable said first gate in a triggered condition and operable to enable said second gate in an untriggered condition, a pulse generator operable to produce an output pulse in response to each signal pulse, and means to switch said trigger circuit to its triggered state in response to each pulse produced by said pulse generator and to maintain said trigger circuit in its triggered state for a predetermined time interval following each output pulse of said pulse generator.

6. A system as recited in claim 5 wherein said means to switch said trigger circuit comprises a capacitor controlling a signal voltage to be applied to said trigger circuit means to discharge said capacitor in response to each output pulse from said pulse generator and means to charge said capacitor through a resistor.

7. A system as recited in claim 5 wherein said means to vary said standard detection interval comprises means to vary the width of the output pulse of said pulse generator in accordance with whether the signal pulse passes through said first gate or said second gate.

8. A system as recited in claim 6 wherein said means to adjust the standard detection interval comprises means to adjust the length of the output pulse of said pulse generator in accordance with which of said gates each signal pulse passes through.

References Cited

UNITED STATES PATENTS 3,271,750 9/1966 Padalino ---------- 340—174.1

BERNARD KONICK, Primary Examiner

W. F. WHITE, Assistant Examiner